Patented Oct. 12, 1937

2,095,630

UNITED STATES PATENT OFFICE 2,095,630

RUBBER COMPOUNDING

Arthur B. Cowdery, Needham, Mass., assignor to The Barrett Company, New York, N. Y., a corporation of New Jersey No Drawing. Application August 20, 1932, Serial No. 629,750

15 Claims. (Cl. 106—23)

This invention relates to rubber compounding, and more particularly to a process for compounding rubber involving the use of softening and/or dispersing agents. The invention also relates to the rubber compound resulting from the practice of this invention and also to the softening and/or dispersing agents employed in accordance with the invention.

Heretofore coal tar distillate oils, palm oil, pine tar, various pitches and tars and other like materials have been added to the rubber mix for the purpose of dispersing fillers such as carbon black, zinc oxide, clays, etc. commonly used in rubber compounding. Resinous materials, such as the polymerization products of cumarone and indene, derived from coal tar oils have also been employed in rubber compounds.

In general, coal tar distillate oils previously used comprise relatively high boiling oils which, after cooling, contain substantial amounts of crystalline material consisting principally of naphthalene, anthracene, phenanthrene and other hydrocarbons of high molecular weight. The use of such oils has been satisfactory in many instances relative to softening and dispersing properties, but has been found to cause discoloration or blooming of the finished rubber product. Other coal tar distillate oils used in compounding rubber are objectionable in certain respects since a too rapid cure is obtained. Some more or less similar coal tar distillate oils have a tendency to dry out the rubber compound before curing.

It is the principal object of the invention to provide rubber compounding agents free from objections mentioned. It is the aim of the invention to improve dispersion of fillers used in rubber compounding while at the same time avoiding discoloration of the rubber products. Adequate dispersion improves the physical properties of the rubber compound and increases the resistance of the compound to abrasion and wear. It is an additional object of the invention to provide rubber compounding agents which do not cause the rubber compounds to dry out before curing. The invention also provides compounding agents characterized by the fact that such improved compounding agents have little or no tendency to activate the rate of cure. Furthermore, the invention provides a process for compounding rubber which yields rubber products having increased tensile strength; resistance to tear, abrasion and cracking; and also having improved aging properties. Additional objects and advantages of the invention will appear from a consideration of the following detailed description:

I have found that by blending the resinous catalytically or preferably acid polymerized constituents of coal tar oils, such as crude benzol, toluol, xylol, solvent naphtha, light oil, and the like and similar oils such as drip oil from gas manufacture, with coal tar distillate oils or light coal tar, an oil-resin product is obtained which may be used to marked advantage in rubber compounding as a softening and/or dispersing agent. According to one embodiment of the invention, the improved agents comprise the products obtained by blending cumarone resin, resulting from the acid polymerization of solvent naphtha, and coal tar distillate oils having a specific gravity above substantially 1.06 at 38° C., boiling above substantially 200° C., and containing substantially no crystalline material.

Cumarone resin is a product which may be obtained by catalytic acid polymerization of cumarone, indene, styrene and the like contained in solvent naphtha or similar raw material. Such resin may be obtained in different grades of hardness, ranging from liquid and plastic substances to hard brittle material having a high melting point. The cumarone resins employed in accordance with the invention are preferably those formed by known methods of treating coal tar oil distillates such as crude solvent naphtha with sulfuric acid, followed by distillation. A suitable cumarone resin may also be obtained by acid polymerization of drip oil from gas manufacture which contains a substantial proportion of resinous constituents of the cumarone-indene series. The invention comprehends preferably the use of acid polymerized cumarone resins varying in melting point from below normal room temperature to about 140° C. or higher. Although acid polymerization is preferred, this operation may be effected by the use of other suitable catalysts such as aluminum chloride and stannic chloride. The resinous substances employed need not be those produced from refined oils, but may be the relatively crude resins resulting from the acid treatment of crude coal tar oils, and remaining in the still on distillation.

A suitable coal tar oil for use in accordance with the invention is, for example, an oil or light tar boiling above about 170° C., preferably above 200° C., and preferably containing substantially no crystalline material. However, in accordance with the preferred embodiments of the invention, a coal tar oil fraction is selected which, after removal of crystalline material therefrom, will have a specific gravity above substantially 1.06 at 38° C. and will boil above substantially 200° C., the oil being permitted to cool to about 25° C. and stand until the crystalline material which forms therein has settled. The resultant clear oil is then removed, for example, by decantation. The limpid oil so produced may be blended with cumarone resin, as hereinafter noted, and the blend compounded with rubber in accordance with the usual procedure. One such oil which may be employed, to particular advantage, is the medium distillate obtained from the distillation of coal tar and having a specific gravity of about 1.07 at 38° C., and which when distilled to the temperatures below indicated in the column at the left gives off the percentages by weight of distillate indicated by the figures opposite the temperature figures:

| Degrees centigrade | Percent |
|---|---|
| 210 | 0.7 |
| 235 | 6.9 |
| 300 | 51.6 |

Another example of a coal tar oil found to be particularly suitable as a constituent of the blend utilized as a softening and/or dispersing agent in the compounding of rubber is the heavier distillate, obtained from coal tar, having a specific gravity of about 1.15 at 38° C., and which when distilled to the temperatures below indicated in the column at the left gives off the percentages by weight of distillate indicated by the figures transversely opposite the corresponding temperature figures:

| Degrees centigrade | Percent |
|---|---|
| 210 | |
| 235 | |
| 300 | 5.1 |
| 315 | 7.4 |
| 355 | 20.2 |

Such oils, as noted, may be obtained as distillate fractions from the usual distillation of coal tar such as coke oven tar and the like, and may consist of a single fraction or a mixture of two or more fractions. The oils are permitted to settle, and the resultant clear oils, free or substantially free from crystals or suspended materials at 25° C., i. e., limpid oils, are utilized in forming the oil-resin blend.

Another oil suitable for the purposes of the invention is a preferably dehydrated crude creosote oil, or one of the oily fractions thereof.

The blends comprising the resinous acid polymerized constituents of coal tar oils and coal tar distillate oils may vary considerably in composition depending more or less on the nature of the rubber compounding formula employed. I have found that blends vary in composition from about one part cumarone resin and about five parts of coal tar distillate oils, on the one hand, to about five parts cumarone resin to about one part of coal tar distillate oils, on the other hand, may be used to advantage. The following are examples of rubber compounded in accordance with the invention:

*Example I*

| | Parts by weight |
|---|---|
| Smoked sheets | 60.5 |
| Carbon black | 26.0 |
| Zinc oxide | 4.5 |
| Oil-resin composition (1:1) | 3.6 |
| Stearic acid | 2.4 |
| Antioxidant | 0.8 |
| Sulfur | 1.8 |
| Accelerator | 0.4 |

*Example II*

| | Parts by weight |
|---|---|
| Smoked sheets | 62.4 |
| Carbon black | 26.8 |
| Zinc oxide | 3.1 |
| Oil-resin composition (3:1) | 3.1 |
| Stearic acid | 1.9 |
| Sulfur | 2.2 |
| Accelerator | 0.5 |

The amount of the oil-resin composition, relative to the rubber, may vary from less than 2% by weight up, and may ordinarily be from 5 to 10% of the rubber.

In Example I, the oil-resin composition is made up of equal proportions of the above mentioned coal tar distillate oil having a specific gravity of about 1.07 at 38° C., and a cumarone resin melting at 45–55° C. and made by acid polymerization of crude solvent naphtha. In Example II, the same substances are employed in making up the oil-resin composition except that the oil and resin are present in proportions of three to one.

The blends of cumarone resin and coal tar oils may be made in various ways. The molten resin, running from the final step of the manufacturing process, may be mixed with the desired amount of coal tar oil. If the resin is already a finished product and is solid at room temperature, the resin may be melted and mixed with the coal tar oil. Again, the required amount of coal tar oil may be added to the crude solvent naphtha prior to polymerization, and polymerization then effected in the presence of the coal tar oil, final distillation being so controlled that the desired amount of coal tar oil is left in the resin produced.

When employing the improved dispersing and/or softening agents along with the usual fillers, compounding of the rubber products may be effected by any of the known methods customary in practice, as by simultaneous mixing of rubber, filler and softener.

It is to be noted that when making up the oil-resin blends in accordance with the invention, it is preferred to employ coal tar oils substantially free from crystals or suspended matter, and having a specific gravity above 1.06 at 38° C., preferably oils having a specific gravity from 1.06 to 1.15 at 38° C., and boiling above substantially 200° C. However, where discoloration of the rubber composition is a factor which may be disregarded because of the particular use to which the rubber product is to be put, it is permissible to employ, in making up the oil-resin compound, other coal tar oils which may contain appreciable amounts of crystalline material. Such oils give good results with respect to softening and/or dispersing. On the other hand, where the best results are desired with respect to softening and/or dispersing, and avoidance of discoloration of the compounded rubber products, it is preferred to employ a crystalline material free coal tar oil, such as described above.

The use of the oil-resin composition in the manner set forth offers substantial practical advantages. Dispersion of filling material through the rubber stock is expedited. As noted, some coal tar oils, while serving well as softening and/or dispersing agents, tend to unduly shorten the time cure below standard. The oil-resin blends of the invention do not have this objectionable effect and still retain the advantageous properties of coal tar oil, relative to softening and/or dispersing. Since the coal tar oils preferably employed are crystalline free, blooming or discoloration of the products is avoided. The oil-resin compounds handle easily, pouring at ordinary temperatures. Rubber stock containing the oil-resin compounds do not dry out, but retain the desired tackiness, this being an important feature in manufacturing where a product is built up of many plies which must be bonded together firmly. Furthermore, the improved rubber stocks made up in accordance with the invention show substantially no tendency to set up at roll mill temperatures, a difficulty which is likely to be encountered in operating with stock including some known softening and/or dispersing agents. Standard tests relative to tensile strength, modulus, and per cent elongation indicate that optimum cure is obtained in the normal time of cure to be expected from the curatives used and the prevailing operating conditions. Hardness of the rubber products is also within the approved range.

This invention, accordingly, renders it possible to produce rubber compositions which result in rubber articles possessing greater wearing qualities than articles heretofore obtained, and is applicable to the manufacture of tire treads and tubes, rubber heels and soles, and various mechanical rubber goods where the improved qualities imparted are desirable.

The term "coal tar oil" as used in the appended claims is intended to include coal tar and coal tar distillate oil. Also, in the claims, the term "catalytic" polymerization is intended to include acid polymerization. Further, "cumarone resin" is to be understood as including the polymers of the cumarone, indene and styrene series.

I claim:

1. A composition comprising rubber having incorporated therein an oil-resin compound comprising from about 1 to about 5 parts by weight of acid polymerized cumarone resin, and from about 5 to about 1 part by weight of a coal tar oil.

2. A composition comprising rubber having incorporated therein an oil-resin compound comprising from about 1 to about 5 parts by weight of acid polymerized cumarone resin, and from about 5 to about 1 part by weight of a coal tar oil substantially free from crystalline material at 25° C., and boiling above substantially 200° C.

3. A composition comprising rubber having therein an oil-resin compound comprising from about 5 to about 1 part by weight of a coal tar oil substantially free from crystalline matter at 25° C. and having a specific gravity of not less than substantially 1.06 at 38° C. and boiling above substantially 200° C., and from about 1 part to about 5 parts by weight of acid polymerized cumarone resin melting at temperatures ranging from less than normal to about 140° C.

4. In the process of compounding rubber the herein described step of expediting and improving the dispersion of filling material through rubber stock by mixing the rubber stock and filling material with a softening mixture comprising a still residue resulting from the acid purification of the lighter coal tar oils and an oily coal tar distillate.

5. In the process of compounding rubber the herein described step of expediting and improving the dispersion of filling material through rubber stock by mixing the rubber stock and filling material with a softening mixture comprising a still residue resulting from the acid purification of the lighter coal tar oils and an oily coal tar distillate, the mixture being added in an amount by weight equal to approximately two per cent. of the weight of the rubber.

6. A rubber compound comprising rubber and filling material having incorporated therein a softening mixture comprising a still residue from the acid purification of the lighter coal tar oils and an oily coal tar distillate.

7. A rubber compound comprising rubber and filling material having incorporated therein a softening mixture comprising a still residue from the acid purification of the lighter coal tar oils and an oily coal tar distillate, the softening mixture being present in an amount by weight equal to approximately two per cent. of the weight of the rubber.

8. A composition for the manufacture of non-fluid rubber articles for addition to rubber stock to expedite and improve the dispersion of filling material therein, the said composition comprising a still residue resulting from the acid purification of the lighter coal tar oils and an oily coal tar distillate.

9. The step in the process of compounding rubber which comprises incorporating with the rubber, filler material, paracoumarone resin made by the acid polymerization of the polymerizable constituents of coal tar oil, and coal tar oil, the amount of resin present relative to the rubber being comparatively small and sufficient to produce a rubber composition which is tacky prior to curing, and the amount of oil present relative to the rubber being comparatively small and insufficient to render the resultant rubber composition fluid.

10. A non-fluid rubber composition comprising rubber having incorporated therewith an oil-resin mixture comprising cumarone resin made by the acid polymerization of the polymerizable constituents of coal tar oil, and coal tar oil, the amount of resin not exceeding 10% of the weight of the rubber, and the amount of oil present relative to the rubber being comparatively small and insufficient to render the rubber composition fluid.

11. In the process of compounding rubber the step of expediting and improving the dispersion of filling material through rubber stock by mixing the rubber stock and filling material with a mixture comprising an oily coal tar distillate and a resin made by the acid polymerization of the polymerizable constituents of coal tar distillates.

12. A rubber compound comprising rubber and filling material having incorporated therein a softening mixture comprising an oily coal tar distillate and a resin made by the acid polymerization of the polymerizable constituents of coal tar distillates.

13. A non-fluid rubber composition comprising rubber having incorporated therewith filler material, paracoumarone resin made by the acid polymerization of the polymerizable constituents of naphtha, and coal tar oil, the amount of resin present, relative to the rubber, being comparatively small, and the amount of oil present, relative to the rubber, being comparatively small and insufficient to render the resultant rubber composition fluid.

14. The step in the process of compounding rubber which comprises incorporating with the rubber vulcanizing material, acid polymerized cumarone resin and coal tar oil, the amount of resin present, relative to the rubber, being comparatively small, and the amount of oil present, relative to the rubber, being comparatively small and insufficient to render the resulting rubber composition fluid.

15. A solid, vulcanized rubber product containing reacted vulcanizing material, acid polymerized cumarone resin and coal tar oil, the amount of resin present, relative to the rubber, being comparatively small and the amount of oil present, relative to the rubber, being comparatively small.

ARTHUR B. COWDERY.